UNITED STATES PATENT OFFICE.

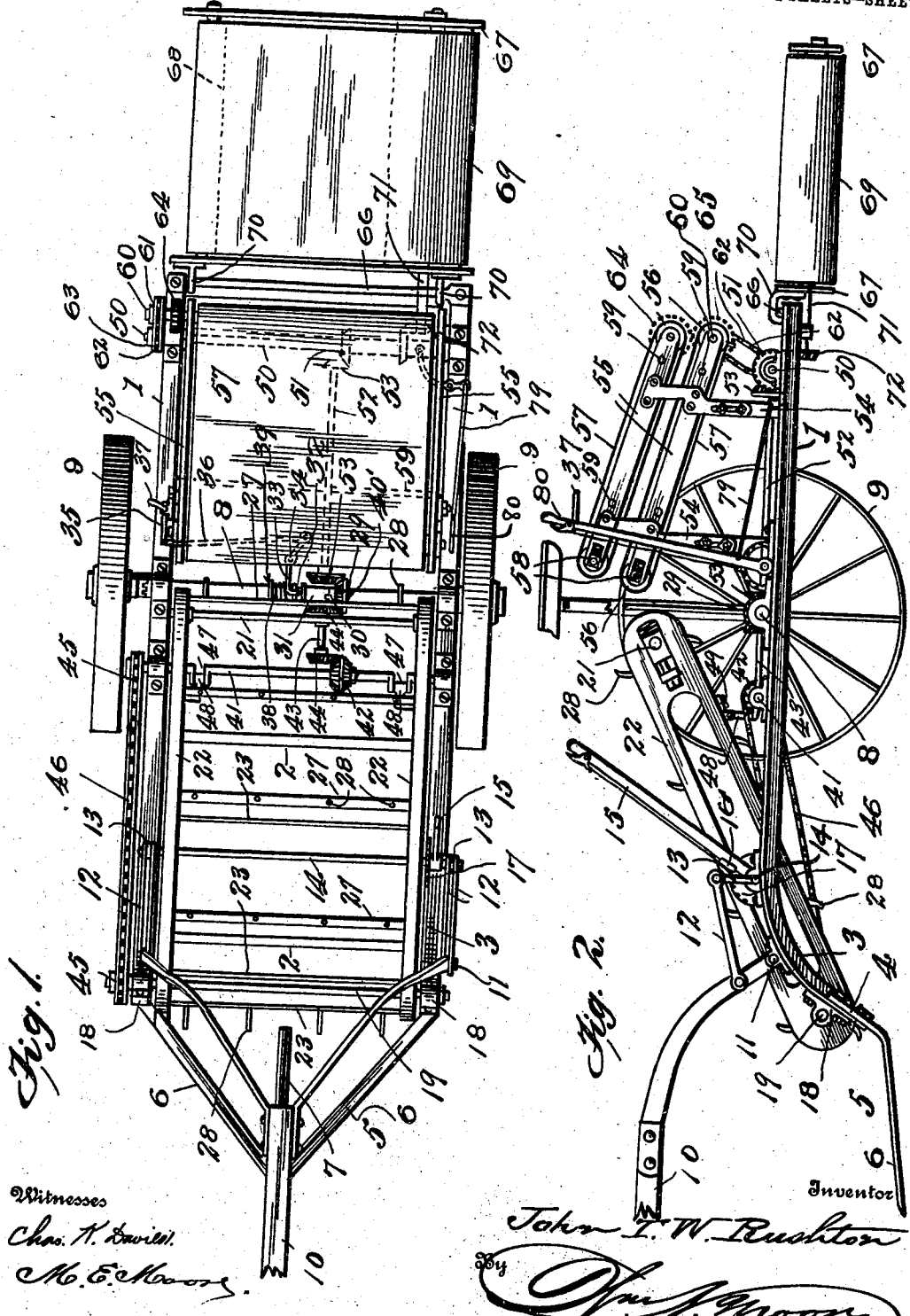

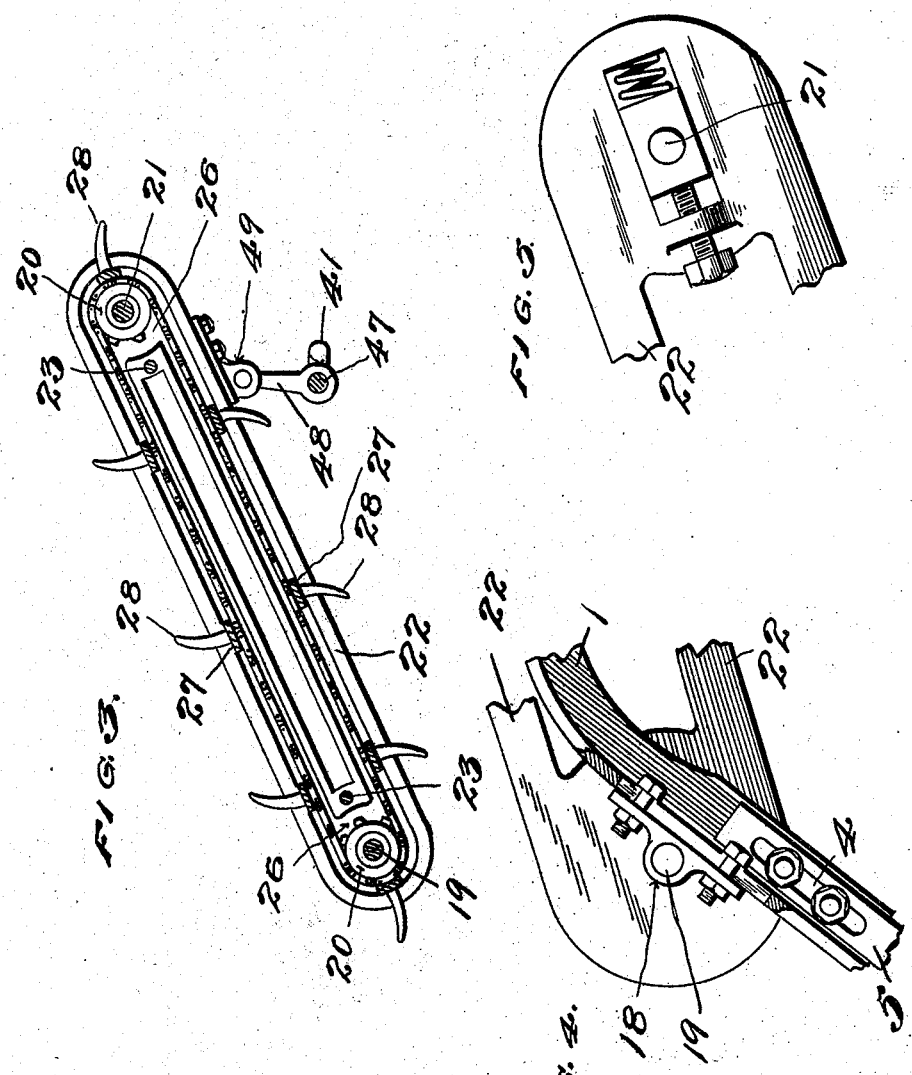

JOHN T. W. RUSHTON, OF BAKERVILLE, TENNESSEE, ASSIGNOR OF ONE-HALF TO GEORGE G. O'GUIN, OF WAVERLY, TENNESSEE.

PEANUT-DIGGER.

No. 894,701.   Specification of Letters Patent.   Patented July 28, 1908.

Application filed May 17, 1907. Serial No. 374,221.

*To all whom it may concern:*

Be it known that I, JOHN T. W. RUSHTON, a citizen of the United States, residing at Bakerville, in the county of Humphreys and State of Tennessee, have invented certain new and useful Improvements in Peanut-Diggers, of which the following is a specification.

My invention relates to improvements in peanut diggers, and has for its primary object the provision of a device of this character which will remove the plants from the ground, elevate the plants and free them of all surplus earth, and which will finally deposit them upon the ground.

Another object of my invention is the provision of a durable machine of simple construction which will accomplish the above results in a practical and efficient manner.

With the above and other objects in view, my invention consists of a plow, a main shaking carrier leading therefrom, a second carrier or series of carriers to receive the material from the main carrier, and means to deposit the material upon the ground.

The invention further comprises a peanut digger embodying certain other novel features of construction, combination and arrangement of parts substantially as disclosed herein and as illustrated in the accompanying drawings, in which:

Figure 1, is a top plan view of the complete machine. Fig. 2, is a side elevation of the same. Fig. 3, is a detached side elevation of the main or shaking carrier. Fig. 4, is a broken detail view showing the manner in which the lower front end of the main carrier is adjustably mounted on the main frame. Fig. 5, is a broken detail view showing the adjustable upper journal bearing in the upper end of the main carrier frame.

The main frame of the machine consists of a pair of side sills 1, which at intervals are connected together and strengthened by the transverse cross braces 2. The side sills are preferably made of angle iron, the front end of the sills being directed downwardly as at 3, and to such depending portions are secured the supporting extensions 4, of the plow 5. These supporting extensions are preferably slotted so that the plow may be adjusted with respect to its connection with the side sills. The plow is pointed and triangular in form consisting of a pair of side shares 6, and a central rearwardly projecting bar 7, leading from the point of the plow. The main or supporting axle 8, is journaled to the sills of the frame, and upon the ends of the axle are secured the supporting wheels 9, which have the usual clutch connection with the axle to prevent backward rotation of the parts.

The tongue 10, is pivoted at 11, to the forward ends of the sills, and is connected by links 12, on each side of the machine with the angular ends 13, on the rock shaft 14, which rock shaft is suitably journaled upon the sills and is provided with an upstanding operating lever 15. The operating lever carries a pawl 16, to engage the notches in the segment plate 17, so that by shifting the operating lever and rock shaft, the main frame is rocked on the supporting wheels to raise or lower the plow.

Journal bearings 18, are adjustably secured on the forward inclined portions of the sills, and in said bearings is journaled the lower carrier shaft 19. Sprockets 20, are affixed on the lower carrier shaft and also on the upper carrier shaft 21, this upper shaft being mounted between the chain guards or casings 22. These side members or chain casings are supported at their lower end upon the lower carrier shaft, and are held in the proper parallel relation by the spacing rods 23, the whole forming a carrier frame as shown. Endless sprocket chains 24, pass over the sprocket wheels and are received in the longitudinal grooves or guideways 25, in the inner face of the side members of the carrier frame. The side members are also provided with an enlarged recess 26, at each end to receive the sprockets, so that the chains and sprockets are almost entirely inclosed and protected. Cross bars or slats 27, are secured between the sprocket chains and carry the upstanding spikes or projections 28, to engage and carry the material excavated by the plow.

A main driving bevel gear 29, is loosely mounted on the axle, which on its inner face is formed with a clutch hub extension 30, which is adapted to be engaged by the corresponding clutch sleeve 31, the said clutch sleeve being slidably keyed upon the axle by a pin 40, a feather or other suitable means. The sleeve is formed with an annular rim 32, which in turn is engaged by the shifting fork 33, the fork being pivoted at 34, on one of the cross bars to the main frame, and this shifting fork is operated from the crank rod 35, through the medium of the connecting link 36. The crank rod is provided with an operating handle 37, on its upper end, so that by operating said handle and partially rotating the crank rod, the motion is transmitted to the shifting fork, which causes engagement or disengagement of the clutch sleeve with respect to the main driving gear. The spring 38, confined between the collar 39, and the clutch sleeve tends to normally hold the clutch members in operative engagement, and the abutment pin or collar 40', prevents lateral movement of the main driving gear.

A counter shaft 41, is journaled parallel to and forward of the main axle, and motion is transmitted from the main driving gear to the bevel gear 42, on the counter shaft, through the medium of the short longitudinally disposed transmission shaft 43, carrying the bevel gears 44, on each end. Motion is then transmitted from this counter shaft to the lower carrier shaft by means of the sprockets 45, and the connecting chain 46. The counter shaft is formed with crank bends 47, near each end, upon which are engaged the lower ends of the connecting rods 48, the upper ends of such connecting rods being pivotally engaged in the brackets 49, on the lower edge of the side members to the carrier frame, so that the upper end of the carrier frame is thus supported upon the counter shaft and is given a reciprocating motion by means of the crank bends therein. The carrier thus serves the double purpose of a carrier to elevate the material and an agitator to shake the loose earth therefrom.

A second counter shaft 50, is journaled at the rear end of the main frame carrying a fixed bevel gear 51. The longitudinal transmission shaft 52, having bevel gears 53, mounted on each end serves to transmit motion from the main bevel gear on the axle to the counter shaft 50. Standards 54, are mounted upon the rearward portion of the frame, and supported on said standards one above the other, are the two pairs of side bars 55, the lower most side bar projecting slightly in advance of the upper and adjacent to the end of the main carrier. Rolls 56, are journaled in the ends of the side bars, and endless conveyers or belts 57, pass over the rolls, these conveyers being preferably of canvas or similar fabric. Spring seated journal boxes 58, are provided for one of the rollers in each pair to allow for the stretching or contraction of the conveyers. The side bars 55, are connected and braced by the spacing rods 59. One of the rolls, preferably the lower-most, is provided with an extended axle 60, carrying the sprocket 61, which is driven by a chain 62, from the sprocket 63, on the extended end of the counter shaft 50. A spur gear 64, is also mounted on the extended axle 60, of the conveyer roll, which meshes with the spur gear 65, on the extended axle of the lower conveyer roll. It will thus be seen that the superposed belt conveyers are mounted substantially parallel and spaced from each other and the opposing faces of both move in the same direction toward the rear of the machine, so that as the material is elevated and freed of earth by the main conveyer, it is received between the two belt conveyers and carried rearward at a downward incline. A transversely arranged depositing carrier 69 mounted at the rear end of the machine, receives the material from the superposed conveyers and deposits it in piles upon the ground.

From the foregoing description taken in connection with the appended drawings, the operation of my invention will be readily understood and its many advantages appreciated, and it will further be apparent that I have produced a practical peanut digger which accomplishes all the results herein set forth as the objects of the invention.

I claim:

1. In a peanut digger, the combination with the main frame comprising side sills connected by cross braces, the sills having a front downwardly directed depending portion, a plow secured to the lower terminus of said sills, a conveyer having its lower end adjustably secured to said depending portions of the sills and slanting upward and backward, and a crank support for the upper end of the conveyer.

2. In a peanut digger, the combination with a main frame comprising side sills connected by cross braces, the sills having a front depending portion, a plow secured to said depending portion of the sills, a conveyer having its lower end adjustably supported by said depending portions, the conveyer slanting upward and backward, a crank support for the upper end of the conveyer, and superposed auxiliary conveyers slanting downward from the upper end of the main conveyer.

3. A peanut digger comprising side sills connected by cross braces and having front depending portions, a plow adjustably secured to said depending portions, a conveyer having its lower end adjustably supported on said depending portions, and slanting upward and backward, a crank support for the upper end of the conveyer, and superposed auxiliary conveyers slanting downward from the upper end of the main conveyer and traveling in opposite directions.

In testimony whereof I affix my signature in presence of two witnesses.

JOHN T. W. RUSHTON.

Witnesses:
J. R. FORSETTER,
A. S. NASH.